United States Patent [19]

Tawara

[11] Patent Number: 5,710,418
[45] Date of Patent: Jan. 20, 1998

[54] OPTICAL IMAGE SENSOR

[76] Inventor: Masami Tawara, 28 Westcott St., Old Tappan, N.J. 07675

[21] Appl. No.: 552,573

[22] Filed: Nov. 3, 1995

[51] Int. Cl.$^6$ ............................................. G06K 7/10
[52] U.S. Cl. ............................................. 235/472; 235/462
[58] Field of Search .......................... 235/462, 472; 250/548; 359/211

[56] References Cited

U.S. PATENT DOCUMENTS

| | | | |
|---|---|---|---|
| 4,262,208 | 4/1981 | Suzki et al. | 250/548 |
| 5,227,910 | 7/1993 | Khattak | 359/211 |
| 5,350,909 | 9/1994 | Powell et al. | 235/472 |

*Primary Examiner*—Harold Pitts
*Attorney, Agent, or Firm*—Henry Schanzer

[57] ABSTRACT

An optical image sensor, particularly a bar code reader, comprises a laser diode emitting a light beam of small area and elliptical cross-section. The light beam is directed onto an optical device for greatly expanding the beam along one axis for expanding the beam cross-section to that of a greatly elongated rectangle having a line-like shape. The line beam is projected from the reader for encompassing and illuminating the entire width of a bar code. Light reflected from the bar code is focused as a complete image of the bar code onto a light detector for simultaneous storage of all the bar code data. The beam expander can comprise a cylindrical lens, a cylindrical mirror, or a conical mirror including means for varying the intercept of the laser beam with the conical surface for selectively varying the width of the expanded beam.

11 Claims, 3 Drawing Sheets

OPTICAL IMAGE SENSOR

BACKGROUND OF THE INVENTION

The invention relates to optical image sensors, and particularly, to image sensors known as bar code readers.

Bar code readers are now in common use. A bar code comprises a plurality of side by side parallel lines, white lines alternating with black lines in accordance with data encoded in the sequence of lines. For reading the data contained in the bar code, a bar code reader projects illuminating radiation (e.g., a light beam) onto the bar code, receives reflected radiation from the bar code, and focuses the received radiation onto a radiation detector for producing an electrical signal indicative of the pattern of radiation reflected from the bar code.

Several requirements are thus present. One requirement is that the projected illuminating radiation illuminates the entire bar code. This can be accomplished in numerous ways, e.g., a hand held scanner where the user sweeps a beam of radiation, such as visible light, across the bar code. In certain types of bar code readers it is desired that the light beam projected onto the bar code simultaneously illuminates the entire bar code.

For example, U.S. Pat. No. 5,187,356 to Chadima, Jr. et al., the subject matter of which is incorporated herein by reference, discloses a hand held bar code reader in which an elongated source of light, e.g., a flash tube, generates an elongated light glow at the focus of an elongated elliptical reflector. The reflector collects and redirects the light in the form of a light beam having a rectangular cross-section. The projected rectangular beam simultaneously illuminates the entire bar code pattern being read.

A shortcoming of the system disclosed in the U.S. Pat. No. 5,187,356, however, is that the flash tube light source, as well as other similar elongated light sources, does not provide high intensity light beams, hence the depth of field of the bar code reader is quite limited.

To overcome this problem, preferred light sources are optical lasers which, as known, generate high intensity, highly collimated light beams. A problem, however, is that the cross sections of typical laser beams are quite small and are, generally, circular or slightly elliptical in shape. Solutions to the problem of small area laser beams are the use of means for the automatic scanning (sweeping) of the emitted laser beam.

For example, U.S. Pat. No. 4,387,297 to Swartz et al., discloses the use of a laser which directs a light beam onto various rotating members for causing reflection of the beam at continuously varying angles for causing lateral or multi-directional scanning of the light beam. Thus, the emitted light beam, although of small area, is caused to sweep across the entire width or surface of the object being imaged.

A similar rotating mechanism, employing continuously rotating reflecting surfaces, is disclosed in U.S. Pat. No. 4,841,129 to Tawara et al.

A shortcoming of the various known rotating mechanisms for causing scanning of a laser beam is that the mechanisms are inherently complicated and subject to wear. Also, they consume relatively large amounts of power and are not well suited for use in battery operated, portable readers where low power operation is obviously desired.

SUMMARY OF THE INVENTION

An optical image sensor comprises a high intensity light source, e.g., a laser diode, for providing a highly collimated, small cross-sectional area beam of light. The light beam is directed onto a curved optical means, e.g., a cylindrical lens or a convex mirror, for expanding one dimension of the light beam for providing a light beam having a line-like cross-section, that is, an elongated rectangle having a large width to height ratio. In one embodiment, the curved optical means is a surface of a cone controllably movable relative to the light source light beam for varying the width of the rectangular light beam.

The rectangular (line-like) beam is projected outwardly from a front end of the image sensor and illuminates an object, e.g., the full width of a bar code, with a relatively high intensity light. Light reflected from the object passes through focusing means in the sensor for creating an image of the object on a light detector, preferably a known charge coupled detector (CCD), which simultaneously detects and stores light intensity information from the entire focused image.

In a preferred embodiment, the light receiving focusing means comprises an elongated slit, the slit functioning, along the short dimension of the slit, as a pin hole lens. This provides the sensor with a large depth of viewing field. The long dimension of the slit functions as a wide aperture lens for efficient gathering of reflected light for increasing the brightness of the focused image and further increasing the depth of sensor viewing field.

DESCRIPTION OF THE DRAWING

The drawings are schematic and not to scale.

DESCRIPTION OF PREFERRED EMBODIMENTS

Figure 1:
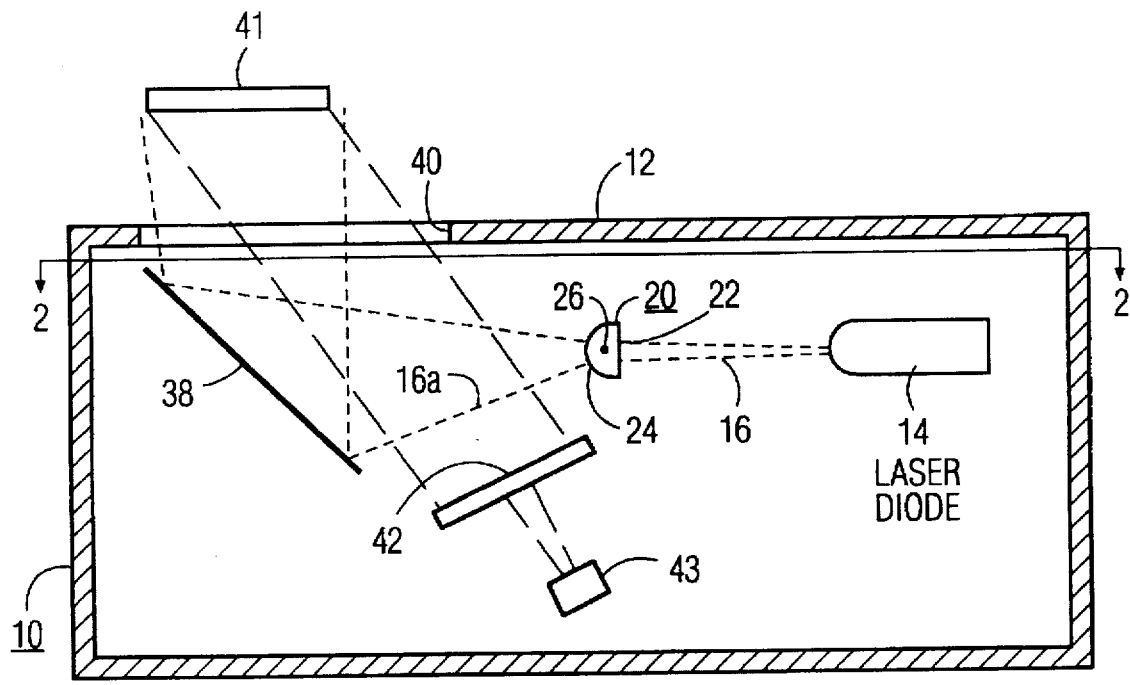
FIG. 1 is a top sectional view of an optical image sensor according to the invention using a cylindrical lens light beam expander.
Figure 2:
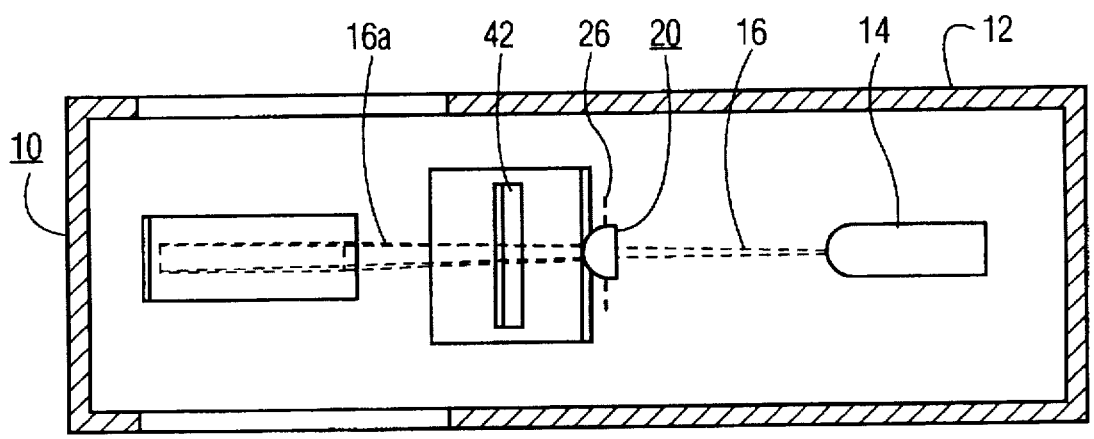
FIG. 2 is a side-sectional view of the sensor shown in FIG. 1 taken along line 2—2 therein.
Figure 3:
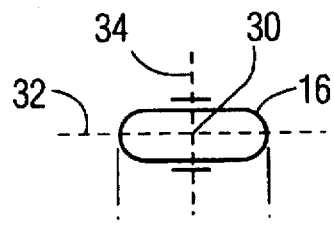
FIG. 3 shows a cross-sectional view of a light beam emitted from a laser diode used in the sensor shown in FIGS. 1 and 2.

With reference to FIGS. 1 and 2, an optical sensor, specifically a bar code reader 10, is illustrated. The reader 10 comprises a housing 12, e.g., of a rigid plastic material, and includes mounted therein a high intensity light source 14, preferably a laser diode. In this embodiment of the invention, the laser diode is a commercially available diode sold by Toshiba Corp. and designated as TOLD 9200. The diode produces a beam 16 of visible light (e.g., 680 nm wavelength) which is highly collimated (having a divergence of less than 10 minutes) and having, at the exiting surface of the diode 14, an elliptical cross-section (FIG. 3) having a major axis length of 4 mm and a minor axis length of 2 mm.

As previously noted, bar code readers are known which use a laser light source together with various rotating members for causing the laser light beam to scan through various angles perpendicular to the beam axis. Thus, in use of such scanning beam readers, the reader is pointed at a bar code and the small area light beam is caused to automatically scan or sweep across the bar code pattern. Light reflected from the bar code is directed onto a light detector within the reader, e.g., a photodiode. In prior art laser based scanners, an image of the entire bar code is not simultaneously focused onto the light detector, but rather successive portions thereof as the light beam sweeps across the bar code. A disadvantage of such light scanning readers is that relative movements between the reader and the bar code, if sufficiently fast, can introduce misaimings of the light beam and corresponding data reading errors. Also, as previously mentioned, the use of rotating light scanning means is undesirable for reasons of complexity, wear and power consumption.

Figure 4:
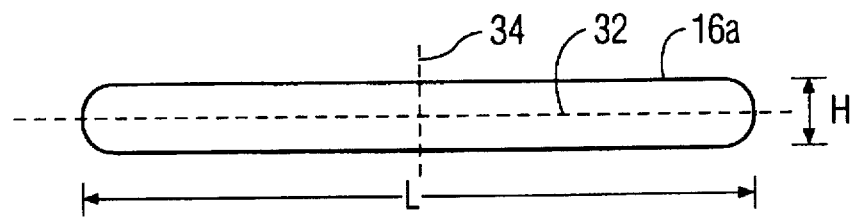
FIG. 4 is a cross-sectional view of the light beam exiting the cylindrical lens of the sensor of FIGS. 1 and 2.

In accordance with this invention, the small cross-sectional area light beam is not sequentially swept across the bar code being read, but one dimension of the light beam is greatly expanded to convert the generally circular or elliptical cross-section of the beam into that of a greatly elongated ellipse or rectangle as shown in FIG. 4.

One means for performing such one dimensional expansion is the use of a cylindrical lens 20 such as shown in FIGS. 1 and 2. Cylindrical lenses are known and comprise a surface of revolution including a flat surface 22 joined to a curved, e.g., parabolic, surface 24. The path of light rays through the cylindrical lens in planes perpendicular to the central axis 26 of the cylindrical lens structure is shown in FIG. 1. The laser diode 14 generated light beam 16 projected onto surface 22 is refracted at the curved surface 24 for greatly increasing the divergence of the outgoing beam 16a. Because the lens surface 24 curves only in planes perpendicular to the cylindrical lens axis 26, only a small divergence of the light beam occurs in planes (FIG. 2) parallel to the axis 26. The effect of the cylindrical lens 20 is thus to expand the beam cross-sectional shape far more along one axis than the other.

For example, using a cylindrical lens 20 having a radius of curvature of 3 mm and of F2 material and starting with an elliptical beam 16 (FIG. 3) having an angle of divergence of less than 10 degrees in all directions with respect to the beam central axis (direction of propagation), the outgoing beam 16a is caused (FIG. 4) to have an angle of divergence of 20 degrees along the major axis 32 of the elliptical beam cross-section, and an angle of divergence of 10 degrees along the minor axis 34. Although the beam is still elliptical, the curvature along the major axis sides of the beam is so small that straight lines are used in FIG. 4 to illustrate the long sides of the beam. Also, owing to the large ratio of beam width(L) to beam height(H), in actual use, the beam has the appearance of, and is referred to, as a "line" beam.

After exiting from the lens 20, the "line" beam 16a is reflected from a flat mirror surface 38 through an aperture 40 and outwardly of the reader.

In use of the reader, which can be hand held, the reader is aimed for positioning (FIGS. 1 and 1A) the line beam astride a bar code 41 to be read.

Figure 1A:
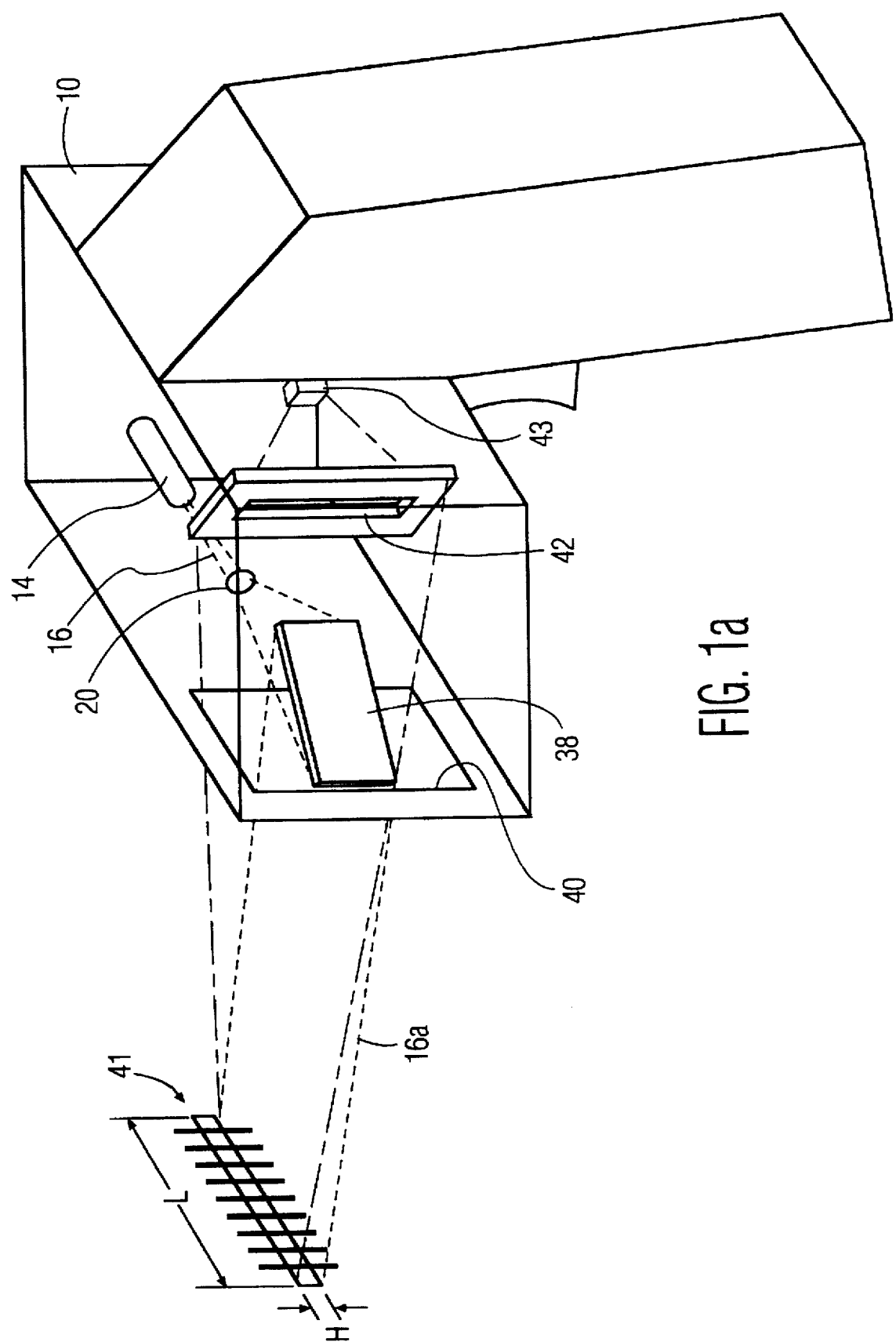
FIG. 1A is an isometric diagram of a bar code reader embodying the invention.

Depending upon the dimensions of the reader, the light beam will have a sufficient width to simultaneously illuminate the full width of the bar code at some minimum distance from the reader aperture. This is illustrated in FIG. 1A for a hand held laser scanner. This minimum distance is determined by the intended use of the reader and, if desired, can be at the sensor aperture itself for use of the sensor as a contact type sensing wand.

At distances beyond the minimum distance, the width of the beam exceeds that of the bar code, but bar code readings are obtainable provided the illuminating light intensity (which diminishes with increasing distance) is sufficiently high so that reflected light returning to the reader can still be detected over background light.

Light is reflected from the bar code in numerous directions, and only a small portion of the reflected light returns to the reader aperture 40 (shown in FIG. 1, 1A). The returning light follows a direct path from the aperture 40 to a focusing means 42 for focusing an image of the bar code on a light sensitive surface of a light detector 43.

Because the forwardly projected light beam fully illuminates the entire width of the bar code (in proper use of the reader), an image of the entire bar code is simultaneously projected onto the light detector 43. Thus, by using a light detector 43 which can detect varying light intensities across an area of the detector, the entire bar code image is simultaneously read or detected. Using known image light detectors, e.g., a charge coupled detector (e.g., sold by Toshiba Corp., Model No. TCD1205), the actual light acquisition time can be quite short, e.g., 10 msec, whereby there is little danger of reading errors caused by relative movements between the bar code and the bar code reader.

Different known focusing means, e.g., a conventional lens system, can be used for focusing the returning light onto the image sensor. A preferred means, however, is basically a "pin hole" of the type used in simple pin hole cameras. An advantage of a pin hole focusing means is that it has a large depth of field, hence can be used for detecting bar codes at varying distances from the bar code reader. A disadvantage, however, is that the necessary small size of a pin hole limits the amount of light which can be acquired. However, owing to the unique nature of a bar code, namely, that all the information is encoded as a variation of light intensity along a single direction (i.e., in a direction across the width of the bar code pattern and perpendicular to the direction of the parallel bar code lines), focusing of the returning light need only be along the single direction. Accordingly, instead of a circular pinhole, an elongated slit 42 (FIGS. 1 and 2) is used, the axis of elongation of which is perpendicular to the axis of elongation of the outwardly projected "line" beam. Thus, the small width of the slit (e.g., 0.2-0.5 mm wide) serves as a pin hole focusing element for a light image extending along a direction perpendicular to the slit axis of elongation, while the large height (e.g., 5-10 mm) of the slit increases the amount of light acquired by the slit and projected onto the light detector.

The use of an elongated "pin hole" focusing means in combination with the means herein disclosed for projecting a "line" laser beam makes it possible to produce an exceptionally simple and inexpensive reader.

Figures 5, 5A:
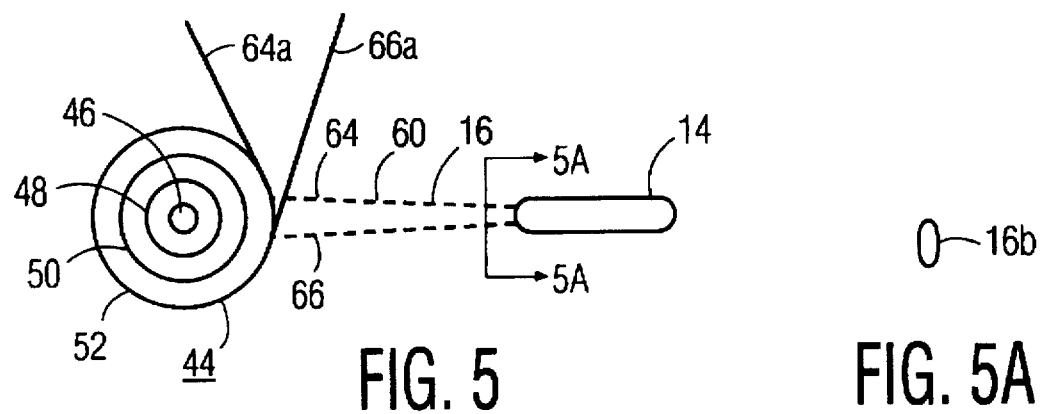
FIG. 5 is a view similar to FIG. 1 but showing only a portion of a sensor using a conical light reflector.
FIG. 5A is a cross-section of the light beam shown in FIG. 5.
Figures 6, 6A:
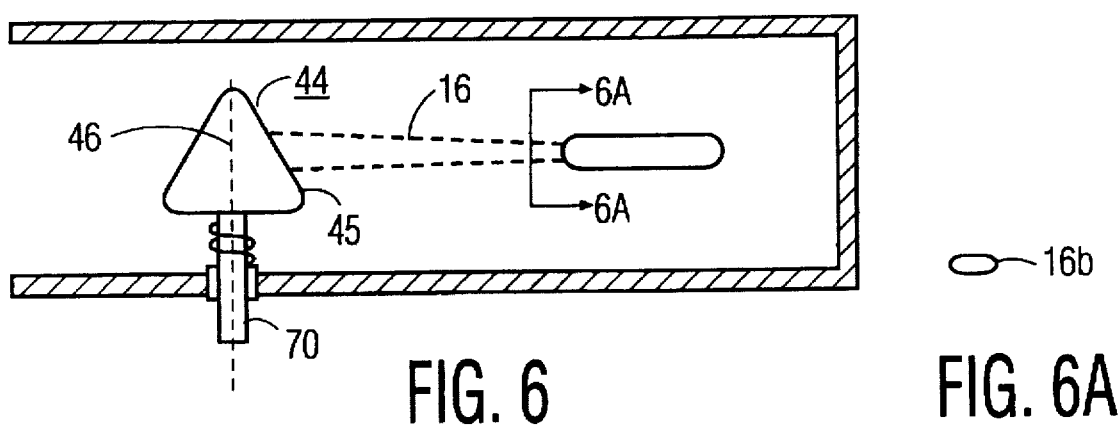
FIG. 6 is a side view of the portion of the sensor shown in FIG. 5.
FIG. 6A is a cross-section of the light beam shown in FIG. 6.

FIGS. 5 and 6 show another means for expanding a laser diode light beam, normally of elliptical cross-section, into a line-like shape. In the FIGS. 5 and 6 arrangement, the light expander comprises a circular cone 44 having a mirror outer surface 45 and a central axis 46 of elongation. The various circles 48, 50, 52 shown in FIG. 5 show points along the cone surface lying in a common plane perpendicular to the central axis 46. The axis 46 is a common center of all the circles.

The laser beam 16 from the laser diode 14 is aimed along an axis 60 of propagation which is perpendicular to the cone axis 46 but which does not intersect the cone axis 46. Also, as indicated by the ovals 16b in FIGS. 5A and 6A, the major axis of the light beam ellipse is perpendicular to the cone axis 46 and the minor ellipse axis is parallel to the cone axis. By virtue of the curvature of the cone surface where it is intercepted (e.g., along circle 52), the angle of divergence between the two light rays 64 and 66 at opposite ends of the major axis of the beam ellipse increases significantly, e.g., from an angle of divergence of 5 degrees to one of 50 degrees.

Because the incident light beam is not directed radially towards the cone axis 46, the side light rays 64 and 66 are both reflected (as light rays 64a and 66a, respectively) in the same general direction with respect to the direction of the incident laser beam 16. Thus, the direction of the light beam is changed and directed away from the light source. (If the laser beam is incident radially against the cone surface, the central axis of beam propagation would be reflected diverging backeardly towards the laser regardless of the direction of the two diverging side rays. This would be wasteful of light energy.)

Alternately, a light expander comprising a cylindrical mirror can be used. One advantage, however, of the use of a conical mirror is as follows.

With only a minor modification, e.g., mounting the conical member on a button 70 (FIG. 6) projecting outwardly through the housing, the axial position of the conical surface 45 relative to the incident laser beam 16 can be adjusted by the user of the bar code reader. Thus, by causing the cone to move downwardly relative to the light beam axis 60, the laser beam intersects the cone surface along a smaller diameter circle, closer to the top of the cone. Thus, the arc length of the cone surface intersected by the laser beam is increased and the angle of divergence of the sides of the reflected beam is also increased. Depending upon the distance of the bar code being read (e.g., from a user checking inventory of shelved articles), the user can vary the beam width as necessary to provide a beam whose width, at the bar code, exactly corresponds to the width of the bar code. This greatly increases the depth of reading field because, at large distances, all the light energy reaches the bar code and is not wasted on either side of it.

While FIGS. 5 and 6 show a complete cone 44 (for ease of illustration), only a segment of a conical (or cylindrical) surface is required. That is, the cone 44 shown in FIGS.5 and 6 is not rotated around the central axis 46, hence all the cone surface on the left-hand side of the cone 44 as illustrated in FIGS. 5 and 6 is unused and can be omitted.

As mentioned, the light detector can comprise a known light image detector. Preferably, the image detector comprises a linear array of light detectors corresponding in pattern to the bar codes being read. That is, the light detector surface is segmented into separate light detecting elements along one direction only of the light receiving surface of the detector. This simplifies the electronics used for scanning and sampling the energy stored in the various elements, in response to receipt of the bar code image thereon, because energy variations in the direction perpendicular to the direction of the segmentation are ignored.

Thus in accordance with Applicant's invention it has been shown that means are provided for elongating a high intensity light beam, such as one produced by a laser diode, and projecting the elongated light beam simultaneously onto an entire bar code, or like image. The light reflected from the entire bar code, or like image, is then sensed in parallel by a photo detector such as a charge coupled device or a linear array of photosensors.

What is claimed is:

1. An optical image sensor comprising:

a laser light source for projecting a first beam of radiation having a generally elliptical cross-section, having a major axis d1 and a minor axis d2, along a first path;

means along said first path for reshaping said first beam into a second beam having an elongated rectangular cross-section and directing said second beam through an aperture of said sensor onto a target for simultaneously illuminating an entire rectangular area on said target with a thin line whose length is much greater than d1 and d2; and means for focusing an image formed by reflection of said second beam from said rectangular area on said target onto a radiation detector comprised of a linear array of photosensing elements for simultaneously detecting radiation intensity variations within said image, at one and the same time.

2. An image sensor according to claim 1 wherein said reshaping means comprises a cylindrical lens having a cylindrical surface having a curvature substantially only in planes perpendicular to an axis of revolution of said cylindrical surface.

3. An image sensor according to claim 1 wherein said reshaping means comprises a mirror having the shape of a segment of a cone surface.

4. An image sensor according to claim 3 including means for varying the position of said cone along a central axis thereof for varying the width of said rectangular second beam.

5. An optical image sensor as claimed in claim 1 wherein said image sensor is a hand held bar code reader;

wherein said second beam is projected simultaneously onto an entire bar code comprised of a plurality of stripes;

wherein light reflected in parallel from said entire bar code is focused onto said radiation detector; and wherein said radiation detector is a charge coupled device.

6. An optical image sensor as claimed in claim 5 further including means for controlling the length of the elongated rectangular cross-section light beam projected onto and across the bar code.

7. A bar code reader for illuminating a bar code comprised of a plurality of parallel bars located externally to the bar code reader and for receiving light reflected from the bar code comprising:

a laser light source located within the bar code reader having an elliptically shaped collimated light beam output;

means within the bar code reader responsive to the laser light source light beam output for elongating the ellipse and projecting the light beam externally of the bar code reader and onto a bar code located externally of the bar code reader for simultaneously illuminating the entire bar code; and photosensing means within the bar code reader responsive to the light reflected from the entire bar code for simultaneously sensing the light reflected from the entire bar code at one and the same time.

8. A bar code reader as claimed in claim 7, wherein the means responsive to the laser light source light beam output includes cylindrical lens means arranged to elongate the ellipse along the major axis of the ellipse.

9. A bar code reader as claimed in claim 7, wherein said means for elongating the ellipse includes a cone shaped reflective surface arranged to project the light beam externally of the bar code reader and to cause the light beam to diverge primarily in one direction perpendicular to the length of the bar code elements so as to encompass the entire bar code.

10. A bar code reader as claimed in claim 7 wherein said photosensing means is a charge coupled device.

11. An optical image sensor as claimed in claim 5 wherein the light reflected from the bar code is focused via an elongated slit onto said radiation detector.

* * * * *